United States Patent [19]

Marks

[11] Patent Number: 5,117,757
[45] Date of Patent: Jun. 2, 1992

[54] ROCKET MOTOR INSULATION AND LIKE MADE WITH THIN TACKY RIBBON

[75] Inventor: John D. Marks, Salt Lake City, Utah

[73] Assignee: Hercules Incorporated, Wilmington, Del.

[21] Appl. No.: 468,302

[22] Filed: Jan. 22, 1990

Related U.S. Application Data

[60] Division of Ser. No. 164,319, Mar. 4, 1988, Pat. No. 5,007,343, which is a continuation-in-part of Ser. No. 762,743, Sep. 5, 1985, abandoned, which is a division of Ser. No. 378,588, May 17, 1982, Pat. No. 4,596,619.

[51] Int. Cl.$^5$ .............................. C06B 45/12
[52] U.S. Cl. ...................... 102/287; 269/3.2
[58] Field of Search .................. 102/284, 287; 264/3.2

[56] References Cited

U.S. PATENT DOCUMENTS

| | | |
|---|---|---|
| 3,995,559 | 12/1976 | Bice et al. .................. 102/100 |
| 4,013,743 | 3/1977 | Blasche, Jr. et al. ............... 264/3 R |
| 4,596,619 | 6/1986 | Marks .................................. 156/171 |
| 4,959,110 | 9/1990 | Russell .............................. 156/187 |

*Primary Examiner*—Peter A. Nelson
*Attorney, Agent, or Firm*—Mark D. Kuller; Edmund C. Ross, Jr.

[57] ABSTRACT

A method of making an elastomer lined composite vessel or portion of such vessel is disclosed. The method comprises causing a thin, tacky ribbon comprising an elastomer (preferably curable) to continuously so encircle a center rotational axis of a madrel as to adjacently position and tack together integral segments of the ribbon substantially circumferentially relative to this center rotational axis thereby forming a layer of the elastomer about the mandrel which may be the shell of the pressure vessel in case of internal application of the insulator or may be a workpiece around which the shell is built over the so-layed ribbon.

2 Claims, 5 Drawing Sheets

1

ROCKET MOTOR INSULATION AND LIKE MADE WITH THIN TACKY RIBBON

This application is a divisional of U.S. patent application Ser. No. 07/164,319, filed Mar. 4, 1988, now U.S. Pat. No. 5,007,343, which is a continuation-in-part of U.S. patent application Ser. No. 06/762,743, filed Sept. 5, 1985, now abandoned, which is a divisional of U.S. patent application Ser. No. 06/378,588, filed May 17, 1982, now U.S. Pat. No. 4,596,619. U.S. patent application Ser. No. 07/164,319 is also a continuation-in-part of U.S. patent application Ser. No. 165,408, filed Feb. 26, 1988, which is a continuation of U.S. patent application Ser. No. 851,988, filed Apr. 14, 1986, now abandoned, which is a continuation-in-part of U.S. patent application Ser. No. 378,588, filed May 17, 1982, now U.S. Pat. No. 4,596,619.

BACKGROUND OF THE INVENTION

1. Field of Use

This invention relates to fabricating composite pressure vessels such as rocket motor cases that have a metal or resin and filament shell lined with elastomer. This invention, more specifically, relates to a method of fabricating these elastomer lined vessels where a tacky ribbon comprising cured or curable elastomer is used in providing the liner.

2. Prior Art

The elastomeric liner used in rocket motor case performs two major functions. First, it thermally insulates the propellant from the case; second, it seals the case from leakage of propellant gases. Prior art methods of insulator manufacture include (1) the molding of green rubber stock in matched metal dies and (2) the hand layup of green rubber sheets followed by vulcanization and grinding to final dimensions. In either circumstance, insulators are next positioned on case winding mandrels (or alternately within a preformed case) where various splicing, hand buffing, bonding and shrinking operations are performed. These methods of fabrication are disadvantageous in view of the need for: a) large facility investments, b) extensive precision tooling, c) long lead times for production that give rise to an inability to accommodate design changes quickly and cheaply, d) failure modes such as insulator to case unbonding being introduced because of hand and bonding operations, and e) labor intensive unit costs.

U.S. Pat. No. 3,303,079 relates to preparation of elastomer lined rocket motor cases. This patent proposes laying calendared sheets of rubber on a mandrel to produce an elastomer precursor layer to the liner. The elastomer layer is encased in a resin and filament wound shell and the resin and elastomer cured together in providing the elastomer lined composite vessel. Laying calendared sheets manually about a mandrel, however, is labor intensive; and it is especially difficult when building thickness with more than two sheets of the elastomer and when covering contoured portions of the mandrel with precise, but variable thicknesses.

OBJECTS OF THE INVENTION

It is an object of this invention to provide elastomer lined vessels.

It is an object to provide an improved method of making these elastomer lined vessels.

It is an object of this invention to provide such a method that readily produces elastomer liners for rocket motor cases and other such vessels with more unfinished dimensional precision of the elastomer than has been accomplished in the prior art.

It is an object of this invention to provide a method of making elastomer lined composite vessels that selectively can include curing together the elastomer liner and resin after the resin which forms part of the shell of the vessel is applied to uncured elastomer of the liner.

It is an object of this invention to build a vessel liner of required, but variable, precise thickness directly on the case mandrel without the need of using matched metal dies constrained within a press for vulcanization, or hand lay up and autoclave vulcanization and grinding to final dimension, or assembly of the parts on the mandrel and bonding thereof.

It is an object of this invention to permit the fabrication of a first article elastomer liner of pressure vessels such as rocket motor cases in a significantly more rapid manner than is the current state of the art, with a further object to reduce production time of subsequent articles to days rather than weeks.

These objects can be accomplished in accordance with this invention; they are more completely described in the following along with how they and other objects are achievable.

SUMMARY OF THE INVENTION

The method of this invention provides a liner for a pressure vessel such as a rocket motor case. The liner comprises elastomer. The shell of the vessel may comprise filaments wound about the liner or a metal case or segment into the liner is installed. The elastomer of the liner may be cured prior to, or after, application to the shell of the vessel.

The method includes causing a tacky ribbon comprising the elastomer to encircle a mandrel rotational axis. The mandrel is configured to be the shell of the vessel or for subsequent filament winding of continuous filamentary materials in forming a curable composite shell about the cured or uncured elastomer precursor to the liner.

Depending on factors such as the relative configuration of the mandrel portion being encircled by the ribbon, the ribbon lays from edgewise to flatly against the mandrel surface. Adjacently positioned segments of the ribbon on the mandrel tack together. The tacking is substantially circumferential relative to the rotational axis of the mandrel.

A continuous layer of elastomer is formed from laying the ribbon on the mandrel in the aforementioned manner. In a first embodiment, the layer comprises curable elastomer which is then encased in filamentary materials in a thermosettable resin matrix by filament winding; the filamentary materials can carry the thermosettable resin as they lay upon this layer of elastomer or can be impregnated thereafter. The thermosettable resin is then preferably partially cured. The curable elastomer and partially cured resin then are cured together in an oven or by microwave. In a second embodiment, the layer of elastomer is cured prior to application of the filamentary materials. In this second embodiment, a ribbon of uncured elastomer is similarly layed on the mandrel but then cured in an autoclave, or more preferably, first overwrapped or encased with sacrificial material which is removed after curing of the elastomer in an oven or by microwave. The sacrificial material can be release tape, dry fiber, shrink tape or a combination thereof. In a third embodiment, the tacky ribbon comprises cured elastomer which is coated with adhesive and layed on the mandrel in a fashion similar to the first and second embodiments. When the vessel has a metal or filament wound shell and is large, e.g. ten feet or greater in diameter, the shell becomes the mandrel and the ribbon is wound on the inside thereof in curable or cured form.

Accordingly, in practice of either the first or second embodiments, this invention Comprises preparinq an elastomer lined vessel such as a rocket motor case by steps including: providing means for issuing a thin ribbon comprising a curable elastomer, the ribbon adapted or adaptable to adhere to itself; providing an applicator for applying the ribbon to a mandrel having a center axis of rotation, the mandrel configured to a shape for making a liner for the vessel or portion thereof; fixing the ribbon to the mandrel on a first surface portion thereof; causing relative rotation between the mandrel and the applicator about the center axis while issuing the ribbon to the applicator at a rate sufficient for applying the ribbon to the mandrel substantially circumferentially about such center axis starting from the first surface portion of the mandrel; continuing together the relative rotation about the center axis while translating the applicator relative to the center axis to lay substantially circumferentially disposed segments of the ribbon adjacently about the mandrel that adhere together in forming a layer of the curable elastomer that covers the mandrel; and curing the layer of elastomer to provide the liner for the vessel or portion of the vessel. The curing of the elastomer is preferably in accordance with the first embodiment and thus in the presence of a shell formed of continuous filaments and thermosettable resin where the filaments have been wound about the layer of curable elastomer. The resin is preferably partially cured or B-staged in this first embodiment prior to final cure of the resin and elastomer; also, the filaments are preferably chosen to have a lower coefficient of thermal expansion than the mandrel material.

In making certain vessels that are used as rocket motor cases, the mandrel shape can include a dome-like shape; an uncured or cured elastomer ring can be positioned at the apex of the dome like mandrel and used as the aforementioned starting surface portion of the mandrel.

In embodiments of this invention involving making liners for large pressure vessels, e.g. diameter greater than about eight or ten feet, the ribbon, described above, cured or uncured is preferably wound on the inside surface of the vessel, and must be so wound of the shell if the vessel is metal. In these embodiments, the applicator is slidably wound on a beam which extends along the central axis of the vessel shell within the shell. The beam bridges between fixed supports (i.e. head stock and tail stock) and the mandrel is rotated which the spring loaded rollers of the applicator press the ribbon against the inside surface of the vessel. The spring loaded rollers are mounted to an arm that swivels from the beam for applying the ribbon to the dome of the vessel, such dome opening sufficiently to permit the beam to extend through it at its apex.

BRIEF DESCRIPTION OF THE DRAWINGS

FIG. 6 is a side view; FIG. 7 is a top plan view.

DETAILED DESCRIPTION OF PREFERRED EMBODIMENTS OF THE INVENTION

Figure 1:
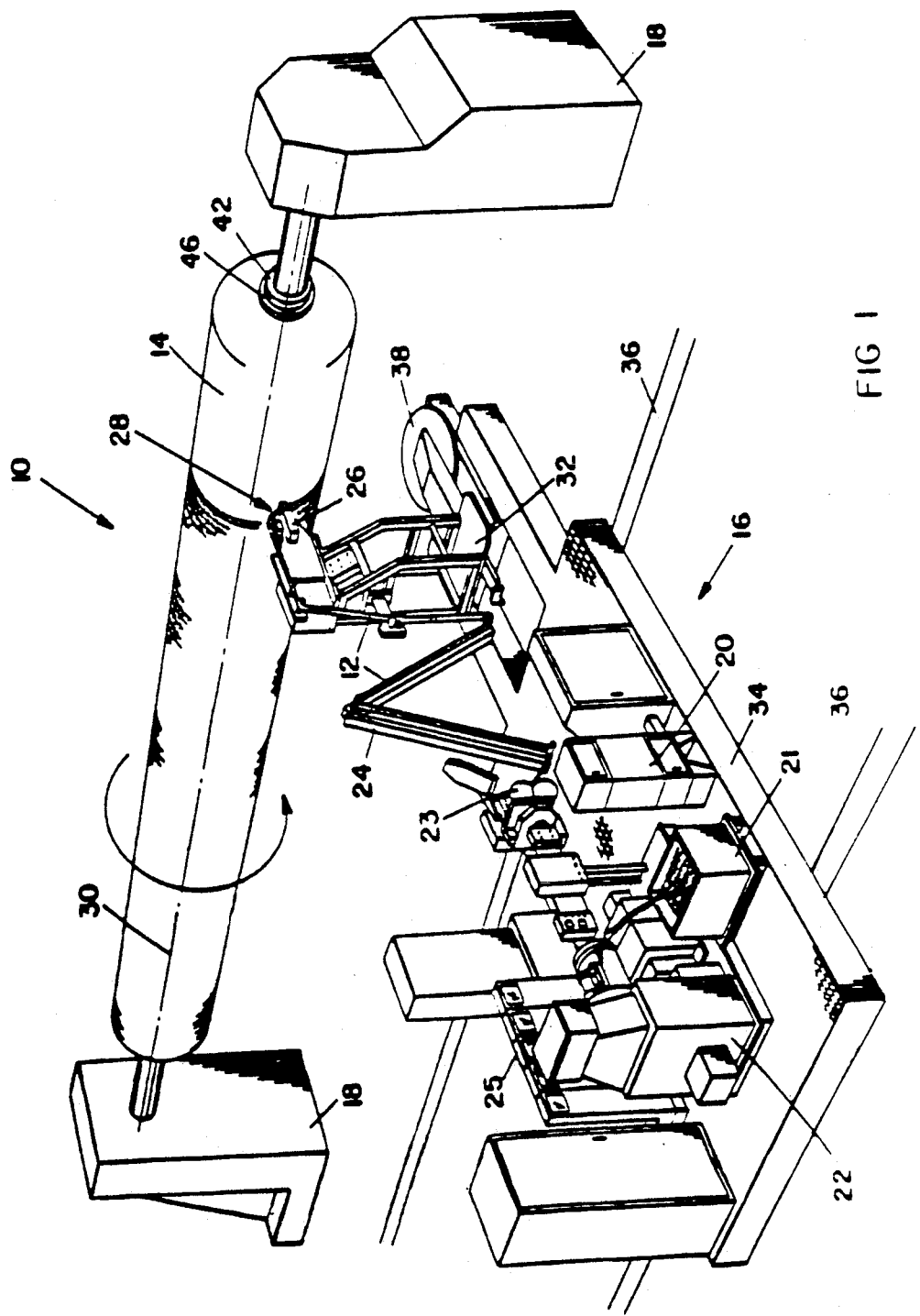
FIG. 1 schematically depicts in perspective an apparatus useful in practicing this invention.

Apparatus 10 depicted in FIG. 1 preferably is used for fabricating the elastomer liner of a rocket motor case in a practice of either of the first and second embodiments of this invention. Apparatus 10 provides continuous tacky ribbon 12 comprising curable elastomer and then causes it to become the elastomer layer precursor to this liner on mandrel 14. FIGS. 2, 3, 4 and 5 further depict operation and results from this operation of apparatus 10.

In general, apparatus 10 serves the functions of ribbon presenting and forming for provision of the elastomer layer precursor of the liner. The presenting function is carried out by ribbon issuing and applying device 16. The forming function is carried out by ribbon receiving and shaping device 18. Control 20 controls coordination and orientation of ribbon 12 between devices 16, 18. Control device 20 is programmed to carry out these coordination and orientation features substantially automatically after the initial set up.

Extruder 22 of ribbon issuing and applying device 16 in FIG. 1 extrudes thin, tacky ribbon 12 comprising curable elastomer from its elastomer supply stock 21. Tacky ribbon 12 proceeds through feed line 24 to applicator head 26 which carries applicator roller system 28. Applicator head 26 is for applying oriented ribbon 12 to mandrel 14 which rotates about mandrel axis 30 during such application. Ribbon 12 issues from extruder 22 at a rate, for example, of between about 50 ft/minute and 250 ft/minute, about equal to the rate at which the surface of mandrel 14 adjacently passes applicator roller system 28. Variations of this latter rate can control ribbon thickness. Temperature of ribbon 12 is controlled by a temperature control unit 25 which maintains and controls temperatures in extruder 22 and the forming dies 23 thereof.

Applicator head 26 is carried on applicator head platform 32 which, in turn, is carried on translator platform 34. Translator platform 34 is translatable along guide rails 36 for moving applicator head 26 parallel to mandrel axis 30.

Applicator head 26 is translatable in an arc through rotation of applicator platform 34 in grooves (not shown) under wheel 38. Also, applicator roller system 28 of applicator head 26 is translatable by means of an air loaded piston (not shown) in the applicator head 26. The air loaded piston responds to pressure exerted as a result of the contours of mandrel 14 witnessed during movement along the aforementioned arc.

Ribbon issuing and applying devise 16 is an adaptation of the Model 601 Orbitread ® New Tire System which is commercially available from AMF Corporation Santa Ana, Calif. 92704. The Model 601 system includes the applicator head 26 and applicator head platform 32, the extruder 22, the AMF HIPAC system 23 for forming ribbon 12 in a precise manner, temperature control unit 25 and control 20, including AMF's Spin Sync Electronic System, for synchronization of devices 18, 22, 23, 26, 32 and 34. The translator platform 34 is an adaption from both the basic filament winding process used in producing composite cases as practiced by Hercules Incorporated and from AMF's Roll Covering Machine (e.g. Series 2000). The former device provides for three axes of applicator head adjustment, viz. parallel and perpendicular to mandrel axis 30 and also in an arc parallel to the dome surfaces of the mandrel. The latter device provides only for the first two of these adjustments. Ribbon receiving and shaping device 18 comprises a mandrel rotating device used in winding fiber composite cases with necessary modifications to provide synchronous coupling with the requirements of device 16. The motor which turns mandrel 14 about mandrel axis 30 is controlled by control system 20 of device 16. Device 18 may also be considered as a modification of AMF Incorporated Spin Station used in rotating a tire carcass and commercially available with the AMF Orbitread ® systems such as Models 510 and 601.

The adaptations of devices 16 (including 34) and 18 include the embodiment in a single device means for precisely forming and applying tacky ribbon to a mandrel such as is used in building pressure vessels (e.g., rocket motor cases) in a wide range of diametral sizes and lengths and further of forming such ribbon in variable thickness with minimum thickness, e.g. 0.040 inch.

Exemplary disclosures in connection with mechanical linkages and electrical control and monitoring thereof suited for devices 16, 18 are in U.S. Pat. Nos. 3,843,482; 3,901,256; 4,062,716; 4,155,789 and 4,209,009, which are hereby incorporated herein for such disclosures. Still other disclosures are in trade brochures entitled "Orbtread 510 and 520 OTR Retreading Systems", copyright 1977 by AMF, "AMF Tire Equipment HIPAC System", copyright 1978 by AMF, "AMF New Tire Systems" copyright 1978 by AMF, AMF Spin Syn ® Electronic System, copyright 1979 by AMF and "AMF Roll Covering Machine", copyright 1974 by AMF of 3705 Sunflower Avenue, Santa Ana, Calif. 97204.

Figure 2:
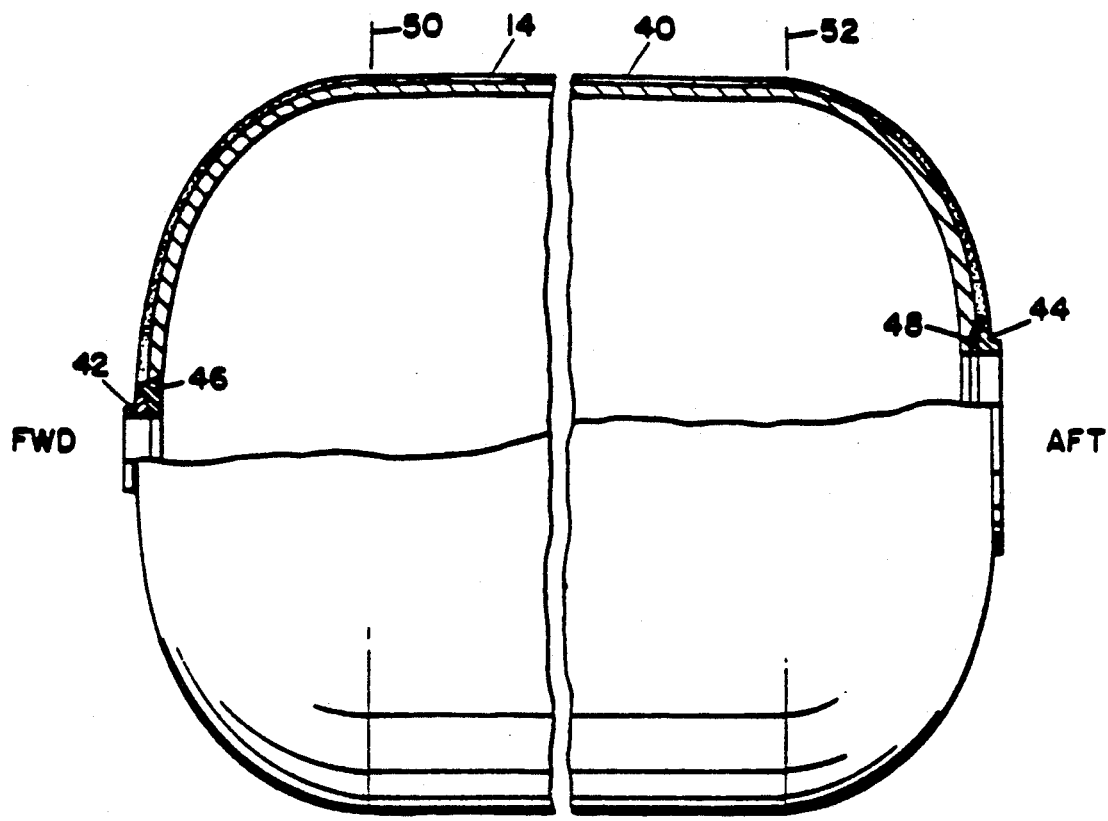
FIG. 2 is a cross section of a rocket motor case liner precursor from forward to aft ends that lays on the mandrel that formed it. The liner is resultant from using the apparatus of FIG. 1.
Figure 3:
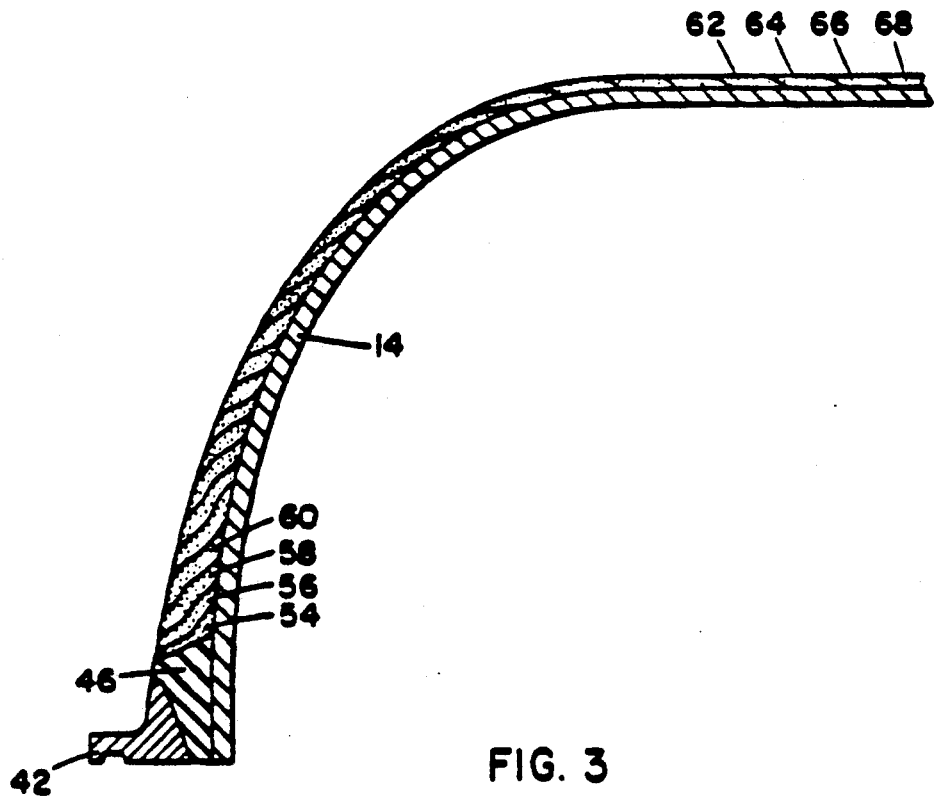
FIG. 3 schematically depicts a portion of the liner of FIG. 2 in order to illustrate the pattern in which the ribbon is layed in forming the liner.

FIG. 2 is a view of mandrel 14 carrying elastomer layer 40, both partly in section, that has been deposited on the surface of mandrel 14 by practice of this invention. Elastomer layer 40 is a curable elastomer precursor layer to a liner of this invention in the first two embodiments mentioned above. The section is partly taken through mandrel 14 and elastomer layer 40 along a line parallel to mandrel axis 30. FIG. 3 further details cross sections of the tacked ribbon segments making up elastomer layer 40, the ribbon cross section being somewhat enlarged for illustration.

Elastomer layer 40 in FIG. 2 extends continuously from forward reinforcing metal ring 42 to aft reinforcing metal ring 44. Forward and aft reinforcing rings 42, 44 are metal such as aluminum but can be made of any suitable material. Forward and aft reinforcing rings 42, 44 contain, respectively, forward and aft premolded elastomer adaptors 46,48. Bolts or other fastening of these metal rings 42,44 attach them to their respective end of mandrel 14.

Elastomer layer 40 has a thickness which varies between forward and aft reinforcing metal rings 42,44, as can be seen in viewing FIG. 3. The thickness varies from between about one (1) inch at the premolded elastomer adaptors 46,48 to about 0.040 inch starting at tangent lines 50,52 of mandrel 14, or at some location generally between tangent lines 50,52.

Mandrel 14 has a thin coating of Teflon release material that has been applied prior to applying elastomer layer 40. This Teflon release material has been coated with a light coating of adhesive such as Longmile Orbiband ® elastomer adhesive material. In alternative practice, mandrel 14 can have a roughened surface that frictionally grips ribbon 12 (FIG. 1) as it lays upon mandrel 14. The roughened surface typically has, however, a coating of standard release agent.

In applying elastomer layer 40 to mandrel 14, a typical procedure is to begin at either of forward or aft elastomer adaptors 46, 48 and to continue depositing ribbon 12 on either dome portions of mandrel 14 associated therewith. The other dome shape is then covered with ribbon 12 starting at the other elastomer adaptor. Then the substantially cylindrical section of mandrel 14 between forward and aft tangent lines 50,52 is covered with elastomer; this substantially cylindrical section, however, can be covered in whole or part with elastomer prior to covering either of the domes.

In covering a dome of mandrel 14 with ribbon 12, the ribbon 12 is first adhesively bonded to the elastomer adaptor thereof. (Either or both of the elastomer adaptors 46,48 may comprise cured or uncured elastomer. When these elastomer adaptors 46,48 are of cured elastomer, bond to the uncured ribbon 12 is assured by use of an elastomer adhesive material such as ChemLok ® from Hughson Chemicals.) Mandrel 14 is then rotated as more ribbon is issued and layed about the apex of the dome adjacent this elastomer adaptor.

FIG. 3 depicts how ribbon 12 is layed on the dome and substantially cylindrical sections of mandrel 14 by showing a cross section of the resulting tacked segments thereof. Ribbon segments 54,56,58,60 etc. lay substantially edgewise against mandrel 14. Ribbon segments 62, 64, 66, 68 etc. lay substantially flat against mandrel 14. The transition from substantially edgewise on the dome shape to substantially flat on this cylindrical section can be gradual as can be seen from FIG. 3. Applicator head 26 (FIG. 1) provides this orientation of segments 54, 56, 58, 60, 62, 64, 66 and 68 etc. to mandrel 14 as is discussed further in connection with FIGS. 4 and 5.

Figure 4:
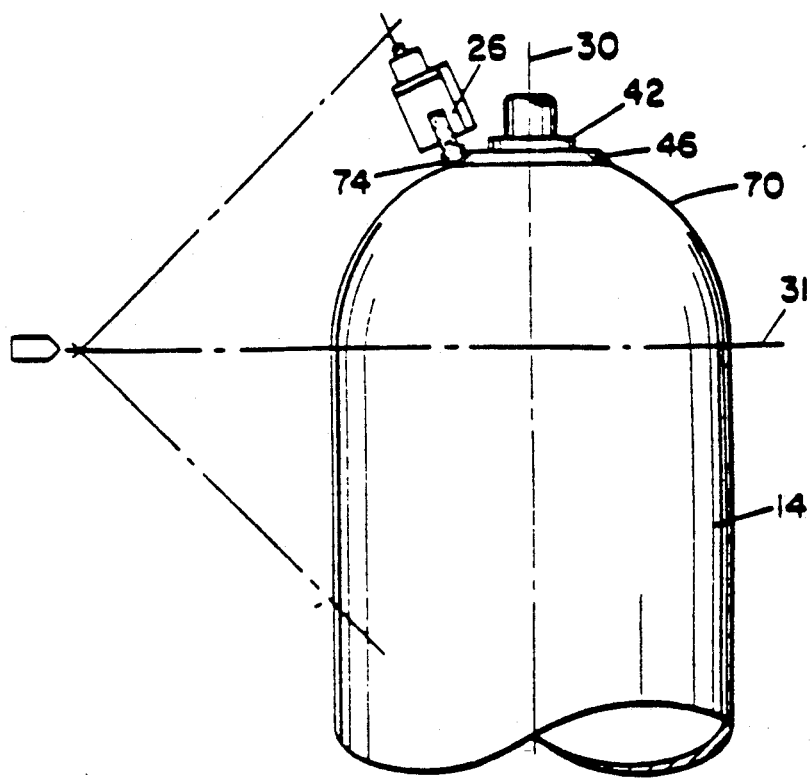
FIG. 4 depicts schematically positioning of an applicator applying ribbon to a dome-shaped mandrel section using this invention.
Figure 5:
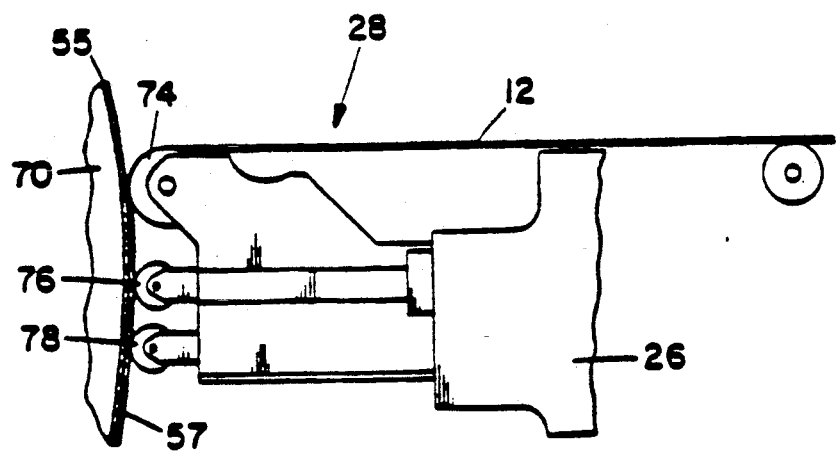
FIG. 5 is a view of an applicator applying a ribbon of elastomer to another portion of the dome section of the mandrel used in making a rocket motor case.

FIG. 4 schematically depicts a portion of apparatus 10 (FIG. 1) as it is used in applying ribbon 12 to dome section 70 of mandrel 14. FIG. 5 shows in a view of application roller system 28 (see, also, FIG. 1) as the rollers thereof apply ribbon 12 to a portion of this dome section.

Application head 26 of apparatus 10 in FIG. 4 can range between angles as much as ±66° on either side of line 31 (which is perpendicular to axis 30) in applying ribbon 12 to the dome sections of mandrel 14. Application roller 74 (of application roller system 28) is first positioned next to the apex of dome section 70 in applying ribbon 12 thereto as shown in FIG. 4. The application of ribbon 12 to dome section 70 thus begins adjacent forward reinforcing ring 46 on forward elastomer ring 42.

Mandrel 14 continues to rotate about mandrel axis 30 as ribbon 12 is fed to applicator head 26 and applied to dome section 70 depicted in FIG. 4. Applicator head 26 translates in an arc about dome section 70 in applying ribbon 12 substantially circumferentially about mandrel axis 30 on this portion of mandrel 14 in continuous fashion. Each segment of ribbon 12 encircling mandrel axis 30 lays on or adjacent the preceding segment and thus tacks with the next adjacent segment of ribbon 12 encircling mandrel axis 30 and laying on mandrel 14. Air loading of applicator roller system 28 assists proper presentation of ribbon 12 to mandrel 14.

Ribbon 12 has a rhomboid or other such cross-section thereby giving adjacently layed segments mating edges that can mate and tack together substantially circumferentially about the mandrel axis 30, as depicted in FIG. 3. After or prior to laying ribbon 12 on dome section 70, ribbon 12 is layed around the substantially cylindrical section of mandrel 14. During this latter operation, head 26 of device 16 translates automatically along guide rails 36 (FIG. 1).

FIG. 5 is a view in elevation, partly developed, of the application a portion elastomer layer 40 to dome section 70 of FIG. 4.

The applicator roller system 28 of FIG. 5 comprises orientation roller 74 and stitcher rollers 76, 78. Orientation roller 74 urges ribbon 12 against mandrel dome 70 and stitcher rollers 76,78 follow this application with pressure against the newly layed ribbon in a manner so as to reject entrapped air. This pressure tacks the newly layed ribbon, e.g. 57 to the previously layed ribbon segment, e.g. 55 substantially circumferentially around the center axis of dome 70 of the mandrel 14.

The ribbon as applied to a mandrel in practicing this invention is, as mentioned, tacky. In preferred embodiments the ribbon comprises curable elastomer. In other practice, however, the ribbon comprises cured elastomer.

For application of a ribbon consisting essentially of uncured elastomer in forming a liner, the following provides an outline of properties that are desirable in a preferred elastomer stock when using an extruder for its issuance:

1. Acceptable green strength so as to withstand application stresses;
2. Mooney viscosity typically between about 10 and 65 at 100° C.;
3. Extrudable without significant edge feathering;
4. Non-scorching during extrusion;
5. Sustainable tack;
6. Cure essentially void free preferably at low pressures and at temperatures below which damage may occur to the reinforcing rings 42, 44 or to the curing composite shell, if employed. (e.g. preferred temperatures are between about 250° F. and 350° F.; pressures between about 10 psig and 50 psig.)
7. Freedom or relative absence of oil-based plasticizers if to be used with in rocket motor cases having propellants which adsorb oil.

The tack of the elastomer is preferably inherent in the elastomer but may be accomplished through addition of a tackifier to the elastomer formulation providing the ribbon. In addition, or even in absence of such a tackifier, heat may be used to provide or enhance tack of the ribbon elastomer as it is being processed during its application by a temperature control unit or other means such as a heat tunnel positioned between the applicator and ribbon producing apparatus. Moreover, adhesive may be applied to the surface of the ribbon to provide or enhance its tack.

Tacking between adjacent segments is enhanced through the geometry of segments of the ribbon layed side by side. Such geometry includes rhomboid configurations. This tacking is further increased by mechanically urging the segments together through what is termed stitcher rollers 76, 78 of FIG. 5.

Although apparatus 10 in FIG. 1 utilizes an extruder for providing a ribbon comprising curable elastomer, other means for providing such a ribbon or other ribbons are also suited for use in this invention. For example, bias cloth tape, elastomer coated, available from Burlington Industries can also be employed where spools of such tape issue it to an applicator head, such as applicator head 26 in FIG. 1, through a heated tunnel to enhance tack thereof. Suitable cloths for the bias tape includes fabric such as graphite or Kevlar fabrics. The cloth is impregnated with elastomer, curable or cured, for this embodiment of the invention. A desirable range for the weight ratio of cloth to elastomer is where the elastomer weighs between about 75 and 125% of the cloth.

The ribbon of this invention may vary in thickness, cross-sectional geometry and width. Generally, ribbons having a constant thickness between about 0.008 and 0.010 inches are preferred for the aforementioned tapes while thicknesses of between 0.025 and 0.050 are preferred for the extruded ribbon. The width is preferably between about 0.5 and 2 inches and may vary depending on the configuration of the mandrel where it is layed. Preferably, the first two layers of the liner insulator are made using a very thin ribbon (e.g. 0.003 inch thick) when making liners for very large rocket motor cases using internal winding. These initial layers establish a base to adhere thicker layers that follow.

Any of the materials e.g. steel, aluminum, plaster commonly used to make mandrels in the prior art can be used as mandrels for this invention. Preferably, however, for the first and second embodiments, the mandrel material is selected to have a higher coefficient of thermal expansion by a factor of over above 1.5 and more preferably two or more than that of the filaments used in winding filamentary reinforcement of the fiber and resin shell. The mandrel may be heated from the inside to provide, however, greater expansion of the mandrel than the filaments during cure of the elastomer.

After completing the application of the ribbon to the mandrel so as to form an elastomer layer about the mandrel, the ribbon is preferably stabilized by winding a tow of continuous filaments about the layer in a helical fashion. This tow of helically disposed fibers is normally removed during, or prior to, application of the filaments making up reinforcement of the fiber and resin shell.

Whether or not the elastomer layed on the mandrel is cured, filaments are wound about the mandrel on the elastomer layer to provide reinforcement for the composite shell of the vessel. The filaments can be wound as resin impregnated with resin filaments or impregnated after their deposition on the elastomer layer.

Present preferred practice is to use a ribbon comprising curable elastomer for making the elastomer layer and to cure this curable elastomer after deposition of the shell comprising filaments and thermosettable resin. This thermosettable resin is partially cured (e.g. B-staged) prior to cure of the curable elastomer.

Any of the usual thermosettable resins can be used in fabricating the composite shell of the pressure vessel in the latter practice or other practices of this invention. Examples of such resins are epoxy and vinyl resins. Preferred resins include those that may be B-staged at relatively low temperatures, e.g. between about 100°–200° F. An example of a suitable commercially available resin is a resin comprising a diglycidyl ether of bisphenol A with an aromatic amine curing agent, available from Dow Chemical Co.

The partially cured resin forms a matrix for the filaments wound about the mandrel. The curable elastomer and partially hardened resin can be cured together in forming the elastomer lines vessel. Curing of the resin and elastomer can be by microwave or in an oven at temperature preferably between about 200°–400° F. The cure of the elastomer is contained between the mandrel and the shell of filaments and thermosettable resin then also undergoing cure. The pressure developed between the shell of filaments and the mandrel replace the need for press or autoclave cure and help integrate the elastomer and cured composite shell in the finished elastomer lined composite vessel.

Figure 6:
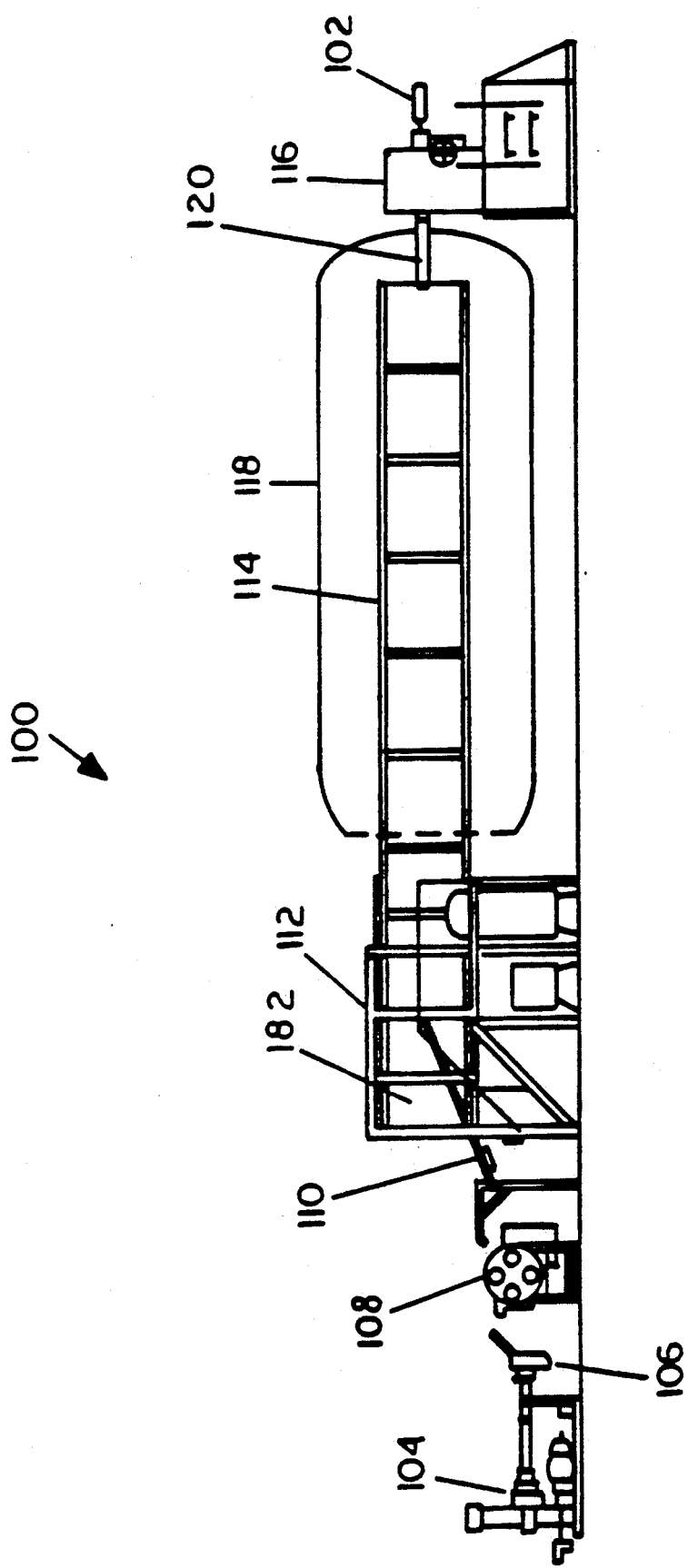
FIGS. 6 and 7 illustrate apparatus 100 useful in producing rocket motor insulation for very large rocket motors. The ribbon applicator is carried on a boom which extends inside the shell of the motor along the central rotational axis 102.
Figure 7:
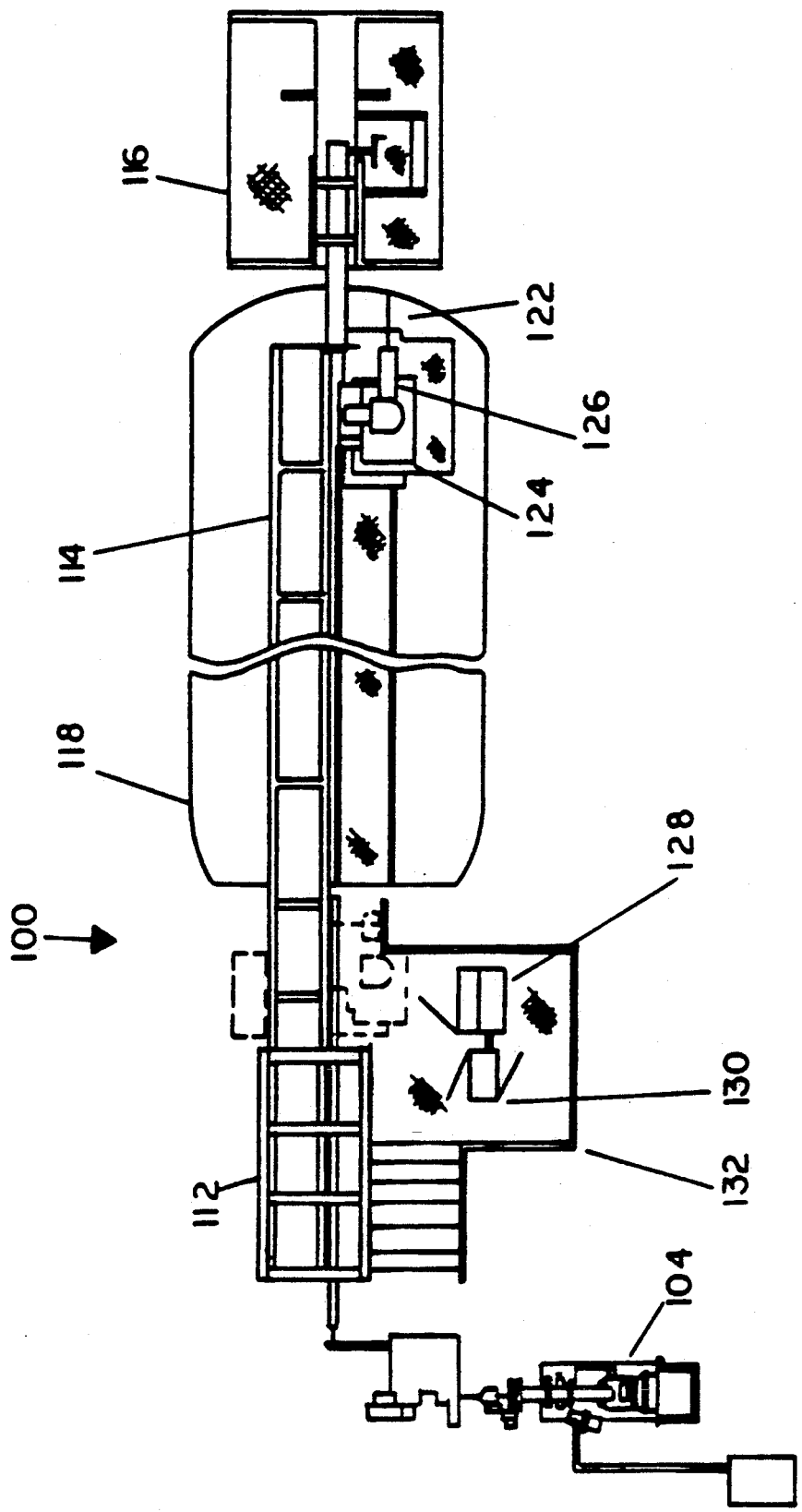

FIGS. 6 and 7 illustrate still other practice of this invention in which the insulation is layed on the inside surface of a previously fabricated composite or metal shell. (Apparatus 100 in FIG. 6 is shown without an applicator for ribbon placement.)

Apparatus 100 comprises extruder 104 having ribbon former 106. The extruded ribbon, formed by extruder 104 and roll former 106 is optionally conditioned (e.g. heated, cooled, adhesive application) at conditioner 108 prior to being conveyed by belt conveyor 110 through headstock 112. Boom 114 extends from headstock 112 to tailstock 116 through extension 120 welded to the boom 114 and fixedly mounted to tailstock 116. Vessel shell 18 rotates around boom 114. Rubber coated rollers (not shown) mount under vessel shell 118 and rotate shell 118. Also, a geared ring mounts around the outside of vessel 118. This gear ring is driven by a second gear ring mounted to the floor under the gear ring mounted to vessel 118. The second gear rinq is driven by a motor which is synchronized with the rollers issuing the ribbon.

FIG. 7 shows a top plan view of apparatus 100 having the same numerical designations for the elements performing the functions described in reference to FIG. 6. Also shown in FIG. 7 are applicator 122 which is slidably mounted to boom 114 and comprises for this purpose carriage 124 on which applicator arm and roller assembly 126 mounts. Arm and roller assembly 126 pivots at its mounting location on boom 114 in effecting ribbon application around the inside of domes at the end or otherwise within pressure vessels.

Control 128 having associated microprocessor 130 is mounted to platform 132 and coordinates the ribbon extrusion and forming with the application of the ribbon by applicator arm and roller assembly 126. The rollers of assembly 126 are rotated in coordination with the rotation of shell 118 such that the ribbon is applied to the inner surface at the same rate the inner surface cf shell 118 passes the applying roller of assembly 126. The ribbon, however, is held in tension prior to reaching this applying roller through adjustment of roller speeds next adjacent the applying roller.

The following examples illustrate aspects of this invention in a more specific manner. The practices illustrated in the examples are not meant to limit this invention, but, rather, detail means for its particular application.

EXAMPLE 1

The following describes a practice of this invention using a 30 in. diameter steel, Teflon coated rocket motor case mandrel and an apparatus such as apparatus 10 depicted in FIG. 1.

Premilled uncured elastomeric stock formed into suitable physical dimension was fed to a 3½ inch diameter extruder. The extrudate was passed through a die unit and formed into a thin ribbon about one inch wide by 0.07 in. thick. The ribbon was applied to the rotating surface of the mandrel, such that the linear speed of the mandrel at the point of application was matched to the linear speed of the ribbon at the die system exit. The ribbon was first layed on the premolded adaptor at the apex of a first dome of the mandrel; then it was continued about this dome. Applied thickness at any point was controlled by varying such parameters as ribbon spacing (turns/inch), ribbon tension, ribbon thickness, rate of linear speed of the mandrel at the point of application to the linear speed of the ribbon at exit from the die system and angle of the ribbon to the surface of the mandrel. The above was accomplished using a conventional tire building machine (model 1901) produced by AMF Incorporated.

The extrudate temperature was controlled to enhance tack of the elastomeric ribbon. The uncured ribbon was held in place by adhesive tack between the ribbon and the starting surface, the ribbon and the contact cement or the ribbon to ribbon surfaces.

At the end of application an elastomeric liner, uncured except for the starting surface, and near design thickness dimensions, was present on the mandrel. To evaluate different formulations a different material was used for each dome. The mandrel was removed from the strip winding machinery. (because of size limitations this work was done using two halves which were later combined into a single case mandrel). The uncured elastomer was stabilized on the mandrel by winding with a single tow of Kevlar fiber in a helical pattern spaced about 10 to 15 inches between wraps. This was later removed.

The mandrel covered with the uncured dimensionally controlled liner precursor was placed on a conventional filament winding machine and a vessel fabricated using Kevlar fiber and the epoxy case winding resin Hercules Incorporated Formulation 55A. The Kevlar fiber was in the form of continuous filaments which were wound in circumferential and helical plies about the uncured liner precursor.

The assembled unit was place in a thermal oven and given rotational (oscillatory) motion about the center axis. The oven temperature was raised to 160° F. and held for two hours. This "B-staged" the resin so that it would not flow from the fiber material and a pressure vessel was formed of the case. No significant cure of the liner material occurred during this step.

To complete the case resin cure and simultaneously to cure the liner elastomeric material, the oven temperature was raised to 310° F. and held for four hours. Then the unit was cooled to room temperature.

During the cure cycle the following pressures (Table I) were indicated by a miniature pressure transducer installed each between one of the steel domes of the mandrel and the uncured liner precursor.

TABLE I

| Condition | Pressure Psig |
|---|---|
| Case as wound, uncured case and insulator. | 48 |
| End of cure at 310° F. | 63 |
| After cure and during cool down as oven temperature passed thru 120° F. | 10 |

Examination of the sectioned case revealed the liner to be well consolidated with hardness typically that of similar material cured in a press at over 100 psi.

The following tabulation (Table II) compares the liner thickness dimensions as measured for the cured, and uncured stocks with the design requirement.

TABLE II

| Stock | Measurement Station | Design Thickness | Thickness as Applied uncured stock | Thickness after cure |
|---|---|---|---|---|
| | | | | at 45° Azimuth[b] |
| No. 71 | 4 | .550 | (a) | .564 |
| | 5 | .390 | .392 | .361 |
| | 6 | .229 | .209 | .231 |
| | 7 | .155 | .193 | .165 |
| | 8 | .144 | .142 | .128 |
| | 9 | .098 | .067 | .088 |
| | 10 | .072 | .068 | .061 |
| | | | | at 30° Azimuth[b] |
| No. 68 | 4 | .550 | (a) | .545 |
| | 5 | .390 | .423 | .425 |
| | 6 | .229 | .231 | .229 |
| | 7 | .155 | .170 | .162 |
| | 8 | .144 | .147 | .132 |
| | 9 | .098 | .120 | .101 |
| | 10 | .072 | .060 | .063 |

[a]Not determined
[b]Azimuth angle is defined as the angle measured clockwise about mandrel axis 30 from a zero degree orientation mark placed on the aft adaptor 44.

Good bond strength was demonstrated by manual attempts to pull the insulator from the Kevlar-epoxy composite; failure was in the composite, not at the insulator to composite bond line. The 90° peel values from subsequent testing are given in the following Table III tabulation:

TABLE III

| Insulator | 90[ peel value. psi |
|---|---|
| −68 | 8, 12 |
| −71 | 26, 44 |

Three samples were tested in an insulator evaluation char motor with conventional EPDM-neoprene-silica insulator samples as the controls. The −71 formulation shows comparable char performance to the conventional formulation as shown in Table IV.

TABLE IV

| | Char Motor 47-Char Rates, mils/sec | |
|---|---|---|
| | Low Velocity | Medium Velocity |
| 7605-71 | 2.3 | 2.5 |
| 7605-68 | 2.8 | — |
| Conventional EPDM-Neoprene-Silica | 2.3 | 2.4 |

The formulation for the elastomer stock in this formulation was as follows in Table V:

TABLE V

| | Stock 71 Parts By Weight | Stock 68 Parts by Weight |
|---|---|---|
| Nordel 2522[1] | 60 | 80 |
| Neoprene FB[2] | 20 | 20 |
| SBR 1500[3] | 40 | |
| SR 350[4] | 10 | 10 |
| SR 209[5] | 10 | 10 |
| Wingtack 95[6] | 10 | 10 |
| $Sb_2O_3$ | | 15 |
| Dechlorane Plus[7] | | 30 |
| HiSil 233[8] | 47 | 20 |
| Zinc Oxide | 5 | 5 |
| Stearic Acid | 1 | 1 |
| Varox DCP-40[9] | 2 | 2 |

[1]Ethylene Propylene Diene Monomer (EPDM) elastomer from E. I. DuPont.
[2]Chloroprene Elastomer available from E. I. Dupont.
[3]Styrene butadiene rubber (SBR) from Goodyear.
[4]Trimethylol propane trimethylacrylate vulcanizer available from Sartomer.
[5]Tetraethylene glycol methacrylate vulcanizer from Sartomer.
[6]Synthetic polyterpene resin tackifier available from Goodyear.
[7]Chlorinated organic flame retardant available from Hooker Chemical and Plastics.
[8]Precipated. hydrated silica available from PPG Industries.
[9]Dicumyl peroxide vulcanizer available from RT Vanderbilt.

EXAMPLE 2

Following the procedures of Example 1 for applying elastomer to the mandrel, the following formulations in Table VI are employed for the elastomer stock:

TABLE VI

| | 69 | 70 |
|---|---|---|
| Nordel 2522[1] | 80 | 80 |
| Neoprene FB[2] | 20 | 20 |
| SBR-1500[3] | | 15 |
| Natsyn 2210[4] | 15 | |
| Hycar 1300[5] | 20 | |
| SR 350[6] | | 10 |
| SR 209[7] | | 10 |
| Wingtack 95[8] | 10 | 10 |
| Hisil 233[9] | 47 | 47 |
| Zinc Oxide | 5 | 5 |
| Stearin Acid | 1 | 1 |
| Varox DCP-40[10] | 2 | 2 |

[1,2,3,6,7,8,9] and [10]See Example 1
[4]Isoprene rubber from Goodyear Chemicals.
[5]Amine terminated polybutadiene acrylonitrile liquid polymer from Goodrich.

The resulting liners prepared as in Example 2 are less satisfactory as compared that obtained in Example 1.

EXAMPLE 3

Following the procedure of example 1, two 40 in. diameter ×38 in. long plaster mandrels with a 13 in. long cylindrical section were fabricated and coated with FreKote 33 as is representative of mandrels used in building composite rocket motor cases. Adaptors 42, 44 covered with premolded cured insulation 44, 48 following U.S. Army specification MIS-30807 B were attached to the mandrel domes. The surfaces of the adaptors to be bonded to the ribbon 12 were coated with Chemlok ® adhesive 236A and allowed to dry a minimum of 30 minutes.

Premilled insulator stock formulation 71 of example 1 was wound onto the mandrel using a modified AMF Model 601 elastomer laying system with standard micro processor control 20 coupled to a specially built rotating stand and provided with a constant length ribbon feed system. The extruder of example 1 was used. The applicator head was modified as required by trial and error to provide for the required placement and tack of the ribbon. By use of a predetermined program placed in the controller, Mandrel X002 was covered with elastomer within a total elapsed time of about 23 minutes. Mandrel X001 was then covered in a total time of 21 minutes 20 seconds including actual wrapping time of 17 minutes 10 seconds.

A rocket motor case including cylindrical end skirts was fabricated on the uncured elastomeric liner of mandrel X001 and cured in the manner of example 1. A thermocouple placed between the mandrel and liner stock registered 296° F. after 10 hours, at which time heating was terminated and the assembly cooled. After mandrel removal, the cured case and liner assembly was subjected to a hydroproof test at a pressure of 515 psig without leakage. Thickness of cured elastomer was determined by a nondestructive ultrasonic measurement technique and compared with design. Over 75% of measurement points of the cured liner were within ±0.020 inch of design requirement. The data are given in the following tabulation.

TABLE VII

AS CURED INSULATOR THICKNESS[a]

| Gage Point Station | Design + .020 | 0[ | 90[ | 180[ | 270[ |
|---|---|---|---|---|---|
| 1 | .526 | NA | NA | NA | NA |
| 2 | .501 | .48 | .48 | .53 | .49 |
| 3 | .445 | .45 | .43 | .44 | .44 |
| 4 | .401 | .41 | .40 | .40 | .42 |
| 5 | .372 | .38 | .36 | .36 | .36 |
| 6 | .360 | .34 | .36 | .35 | .34 |
| 7 | .363 | .35 | .34 | .34 | .35 |
| 8 | .377 | .34 | .37 | .34 | .35 |
| 9 | .396 | .39 | .37 | .38 | .39 |
| 10 | .413 | .43 | .40 | .40 | .44 |
| 11 | .429 | .41 | .42 | .42 | .42 |
| 12 | .451 | .45 | .44 | .43 | .44 |
| 13 | .478 | .51 | .51 | .49 | .51 |
| 14 | .507 | .55 | .53 | .53 | .54 |
| 15 | .533 | .54 | .52 | .54 | .55 |
| 16 | .551 | .52 | .52 | .54 | .53 |
| 17 | .560 | .55 | .55 | .54 | .56 |
| 18 | .565 | .56 | .57 | .55 | .56 |
| 19 | .560 | .56 | .59 | .56 | .57 |
| 20 | .502 | .51 | .51 | .50 | .52 |
| 21 | .444 | .45 | .44 | .46 | .47 |
| 22 | .387 | .38 | .36 | .37 | .38 |
| 23 | .329 | .34 | .35 | .35 | .35 |
| 24 | .271 | .31 | .27 | .32 | .28 |
| 25 | .213 | .21 | .22 | .21 | .20 |
| 26 | .180 | .20 | .16 | .17 | .16 |
| 27 | .199 | .19 | .19 | .21 | .21 |
| 28 | .220 | .26 | .23 | .20 | .19 |
| 29 | .241 | .26 | .26 | .26 | .26 |
| 30 | .264 | .26 | .26 | .26 | .26 |
| 31 | .289 | .26 | .27 | .27 | .27 |
| 32 | .315 | .29 | .27 | .26 | .29 |
| 33 | .343 | .34 | .33 | .33 | .34 |
| 34 | .374 | .34 | .35 | .36 | .34 |
| 35 | .409 | .38 | .40 | .38 | .39 |
| 36 | .453 | .44 | .43 | .43 | .46 |
| 37 | .498 | .51 | .53 | .50 | .54 |
| 38 | .534 | .56 | .57 | .55 | .56 |

NOTE: Numbers underlined are outside ± 0.020 in. range.
[a]Comparison of Design Thickness vs Ultrasonic Inspection - X-001

EXAMPLE 4

The uncured elastomer coated on Mandrel X002 of Example 3 was covered with bleeder cloth and a vacuum bag. The assembly was placed in an autoclave, a vacuum established and then pressure applied to 50 psig. The vacuum source was then closed and the assembly heated to 325° F. and held for four hours. After cooldown and removal from the autoclave the vacuum bag and bleeder cloth were removed from the cured elastomer which displayed surface roughness from wrinkling of the vacuum bag. These surface rough spots were ground away. Mechanical measurements were made by difference between the original mandrel dimensions and the cured elastomers outer surface to determine the liner thickness. The data are given in the following tabulation. There was no machining of this demonstration unit to precise dimensional requirements. A rocket motor case duplicating that of example 3 was then fabricated directly on the cured elastomer covered mandrel, cured in a microwave chamber and the mandrel removed.

TABLE VIII

AS CURED INSULATOR THICKNESS[a] - X002

| STATION | CURED THICKNESS | | | | DESIGN |
|---|---|---|---|---|---|
| | 0° | 90° | 180° | 270° | |
| 1 | .610 | .605 | .557 | .624 | .526 |
| 2 | .552 | .543 | .513 | .545 | .501 |
| 3 | .458 | .430 | .477 | .454 | .445 |
| 4 | .446 | .454 | .419 | .435 | .401 |
| 5 | .391 | .412 | .373 | .399 | .372 |
| 6 | .361 | .364 | .327 | .368 | .360 |
| 7 | .333 | .345 | .310 | .328 | .363 |
| 8 | .339 | .338 | .332 | .355 | .377 |
| 9 | .397 | .387 | .363 | .404 | .396 |
| 10 | .426 | .416 | .378 | .425 | .413 |
| 11 | .410 | .418 | .399 | .424 | .429 |
| 12 | .448 | .446 | .433 | .463 | .451 |
| 13 | .586 | .586 | .502 | .519 | .478 |
| 14 | .550 | .545 | .538 | .558 | .507 |
| 15 | .578 | .563 | .551 | .569 | .533 |
| 16 | .583 | .566 | .548 | .575 | .551 |
| 17 | .588 | .579 | .566 | .583 | .560 |
| 18 | .571 | .573 | .558 | .593 | .565 |
| 19 | .592 | .562 | .563 | .573 | .560 |
| 20 | .512 | .491 | .494 | .504 | .502 |
| 21 | .468 | .451 | .441 | .481 | .444 |
| 22 | .398 | .390 | .400 | .411 | .387 |
| 23 | .363 | .353 | .348 | .378 | .329 |
| 24 | .317 | .311 | .287 | .335 | .271 |
| 25 | .229 | .213 | .216 | .245 | .213 |
| 26 | .219 | .198 | .166 | .192 | .180 |
| 27 | .273 | .258 | .246 | .256 | .199 |
| 28 | .248 | .230 | .231 | .253 | .220 |
| 29 | .266 | .250 | .265 | .272 | .241 |
| 30 | .253 | .247 | .262 | .270 | .264 |
| 31 | .275 | .265 | .286 | .298 | .289 |
| 32 | .292 | .282 | .300 | .313 | .315 |
| 33 | .326 | .321 | .342 | .342 | .343 |
| 34 | .332 | .324 | .345 | .338 | .374 |
| 35 | .450 | .425 | .396 | .446 | .409 |
| 36 | .543 | .516 | .556 | .548 | .453 |
| 37 | .621 | .632 | .650 | .618 | .498 |
| 38 | .673 | .694 | .709 | .670 | .534 |

NOTES: [a]Thickness by difference using stand-off template gage.

EXAMPLE 5

Three 7½ inch diameter steel rocket motor cases were prepared for bonding insulation to the interior walls using standard manufacturing procedures; then insulation was installed in each case following the method of Example 3. After cure the insulation of each case was dimensionally checked to assure conformance to requirements. Two of the cases were selected for integration into the ongoing program for normal processing. The cases were loaded with propellant then assembled into rocket motors.

The motors were statically fired, one at −65° F. and one at +145° F. After firing the insulation remaining was measured and found to have performed acceptably.

EXAMPLE 6

Following the method of Example 5 an rocket motor case was insulated with rubber insulator material, propellant loaded and test fired. The insulation remaining after firing was found to have performed equally or better than insulation applied by hand.

EXAMPLE 7

The following describes a practice of this invention using an equipment set-up consisting of a cold feed extruder equipped with roller forming dies at the outlet, a ribbon applicator system, and a synchronized rotation device. The latter supported and rotated a 145-in. diameter steel ring, 12-in. long and ½ in. thick. Two spin synchronization systems were used, one from the roller dies to the rotating drive, the second from the dies to the applicator wheel. By driving the applicator wheel surface slightly faster than the rotational speed surface, the rubber was carried from tension on the approach ("inlet") side of the applicator to a free-standing condition on the discharge side.

The steel ring was degreased with TCE, coated with Chemlock 205, dried 40 min., then coated with Chemlock 233 and dried overnight. Just before application of the insulation rubber, the ring was given two coats of contact adhesive formulation No. 8013-163. This material proved very successful in holding the initial layer of rubber in contact.

Extrusion conditions were as follows:

| Ribbon | Width | 1.375 @ Top |
| | | 1.715 @ Bottom of Trapazoid |
| | Thickness | .124 to .127 Occasional |
| | | to .136 in. |
| Flash | Thickness | ~.020 |
| | Width | 0 to 0.3 in. Range |
| Die | Orifice | .53 × 1 in. |
| | Roller Grove | .080 × 1.88 at Widest, 20° Angles |
| | Gap | .005 |
| Temperature | | 125° F. All Set Point |
| | | Bulk Rubber 189° F. |
| Extrusion Rate | | 30 ft/min. |

Approximately 425 pounds of NBR-Silica-Asbestos insulator rubber was applied to the ring; thickness from 0.1 in. to 3.5 in. The ring was then removed from the rotating station and strapped upright for a 48-hour waiting period. The bottom of the ring flattened considerably, adding extra stress to the uncured rubber-metal bond. After 48 hours there was no sign of separation, indicating the uncured rubber had adequately adhered to the ring and could then undergo vacuum bagging and cure.

A typical vacuum bag system consisting of texture cloth, bleeder cloth, and nylon vacuum bag, were applied over the rubber on the ring and the vacuum bag sealed. Vacuum leak check was performed to assure a minimum leak rate.

The assembly was moved into a large autoclave. The 12 thermocouples and 6 vacuum lines were connected.

Cure cycle required approximately 13 hours as tabulated here:

| | Time Minutes | Cumulative Time Minutes | Hours |
| --- | --- | --- | --- |
| 1. 50 psig is vacuum point of no return | | | |
| 2. Pressurize 220° F. Actual | 139 | 139 | 2.3 |
| 3. Raise autoclave temp 235° F. | 14 | 153 | 2.6 |
| 4. Hold until lowest TC reaches 200° F. | 150 | 303 | 5.1 |
| 5. Raise autoclave temp 340° F. | 50 | 353 | 5.9 |
| 6. Hold until lowest TC | 223 | 576 | 9.6 |

| | Time Minutes | Cumulative Time Minutes | Hours |
| --- | --- | --- | --- |
| reaches 320° F. | | | |
| 7. Cool vessel temp < 150° F., highest TC < 225° F., 197 min | 197 | 773 | 12.9 |

Pressure was 100 psig ±5 until cooldown. At end of cooldown, pressure was 66 psig.

Vacuum was maintained throughout cure until the system was removed from the autoclave.

After removal of the vacuum bag, the assembly was sectioned into a number of segments for photographing and physical testing.

EXAMPLE 8

A parallel procedure to that of Example 7 was used except that the 145 in. diameter ring was of graphite composite material.

Differences in surface preparation were: a) the addition of a buffing step conducted with abrasive flapper wheels, and b) omitting the Chemlok 205 primer coat. In the autoclave, two additional vacuum lines were added to the composite side of the vacuum bag.

EXAMPLE 9

Following the successful demonstration of Examples 7 and 8, a machine was designed and fabricated capable of automatically applying elastomer internally to a 12-ft. dia., up to 32 ft. long rocket motor case or case segment (FIG. 1). Further, a mockup test apparatus was built for proofing the process without the need for a very expensive rocket motor case. The mockup consisted of a 10-ft. long cylinder and a simulated dome constructed of a conical section. The opening in the "dome" was of a diameter equal to that of a very large flight proven solid rocket motor case. The mockup was synchronously rotated with the application system. A total of four synchronization systems are used to control application of the rubber strip.

Flight-proven, large rocket motor insulation of NBR-silica-asbestos was applied internally and automatically to the simulated rocket motor case using the newly constructed apparatus. Application was done using the following patterns:
  a. Spiral Ribbon, one to four layers.
  b. Single layer butt, one to four layers, thickness 0.100 to 0.400 in.
  c. Single layer lap thickness, 0.200 to 0.500 in.

EXAMPLE 10

Following the methods of Example 9, a proven insulation of EPDM-silica was internally applied.

EXAMPLE 11

Following the methods of Example 9, an insulation useful for elimination of asbestos fiber, in development of another large rocket motor, and consisting of EPDM-aramid fiber, was internally applied.

EXAMPLE 12

Following the methods of Example 9, an insulation useful for elimination of asbestos fiber and consisting of EPDM-silica-aramid fiber, was internally applied. A fourth pattern, producing thickness from 0.1 in. to 1.5 in., was also used.

Samples were cut from the wrapped insulator and cured, either in an autoclave or a laboratory press, giving the following typical results:

|  | Autoclave Cure | Laboratory Press Cure |
| --- | --- | --- |
| Ultimate Tensile Strength, psi | | |
| With fibers | 2734 | 2274 |
| Across fibers | 902 | 925 |
| Ultimate Elongation, percent | | |
| With fibers | 20 | 20 |
| Across fibers | 67 | 80 |

Tests of bondability were conducted with the following excellent results:

| Bondline | Tensile Adhesion, Psi |
| --- | --- |
| Insulator/HTPB Propellant | 160 |
| Insulator/Steel | 480 |
| Cured/Uncured Insulator | 500 |
| Cured/Cured Insulator Using Rubber Adhesive | 428 |

What I claim and desire to protect by Letters Patent is:

1. A method of insulating a rocket motor case having a dome which comprises forming a continuous layer of curable elastomer with a thin, tacky ribbon by adjacently positioning and tacking integral segments of said ribbon together in a shape conforming to at least that portion of said rocket motor case that includes said dome and then curing said elastomer under pressure.

2. A method in accordance with claim 1, wherein said curing comprises heating in an autoclave.

* * * * *

UNITED STATES PATENT AND TRADEMARK OFFICE
CERTIFICATE OF CORRECTION

PATENT NO. : 5,117,757

DATED : June 2, 1992

INVENTOR(S) : John D. Marks

It is certified that error appears in the above-identified patent and that said Letters Patent is hereby corrected as shown below:

On the title page, Item[60] line 3, change "September 5, 1985" should read -- September 12, 1985 --.

Column 9, line 40, "ring" should read --ring --.

Signed and Sealed this

Seventh Day of December, 1993

*Attest:*

BRUCE LEHMAN

*Attesting Officer*  *Commissioner of Patents and Trademarks*